(12) United States Patent
Okamura et al.

(10) Patent No.: US 11,945,630 B2
(45) Date of Patent: Apr. 2, 2024

(54) AIR-PERMEABLE PACKAGING MATERIAL, AND PACKAGE AND PRODUCTION METHOD THEREFOR

(71) Applicant: ENEOS CORPORATION, Tokyo (JP)

(72) Inventors: Tomoyuki Okamura, Tokyo (JP);
Keiichi Ootsubo, Sanbu-gun (JP);
Masahiro Wakayama, Sanbu-gun (JP)

(73) Assignee: Eneos Corporation, Tokyo (JP)

( * ) Notice: Subject to any disclaimer, the term of this patent is extended or adjusted under 35 U.S.C. 154(b) by 808 days.

(21) Appl. No.: 16/979,807

(22) PCT Filed: Mar. 18, 2019

(86) PCT No.: PCT/JP2019/011165
§ 371 (c)(1),
(2) Date: Sep. 10, 2020

(87) PCT Pub. No.: WO2019/181848
PCT Pub. Date: Sep. 26, 2019

(65) Prior Publication Data
US 2021/0039854 A1    Feb. 11, 2021

(30) Foreign Application Priority Data

Mar. 20, 2018 (JP) ................. 2018-053350

(51) Int. Cl.
*B65D 65/40* (2006.01)
*B32B 5/02* (2006.01)
(Continued)

(52) U.S. Cl.
CPC ............. *B65D 65/40* (2013.01); *B32B 5/022* (2013.01); *B32B 27/08* (2013.01); *B32B 27/12* (2013.01);
(Continued)

(58) Field of Classification Search
CPC .... B65D 65/40; B65D 81/264; B65D 81/268; B65D 81/28; B32B 5/022; B32B 27/08; B32B 27/12; B32B 27/32; B32B 2262/0253; B32B 2262/0284; B32B 2262/12; B32B 2307/518;
(Continued)

(56) References Cited

FOREIGN PATENT DOCUMENTS

| | | |
|---|---|---|
| CN | 1545432 A | 11/2004 |
| JP | H08-244847 A | 9/1996 |

(Continued)

OTHER PUBLICATIONS

Translation of JP-H08244847-A (Year: 1996).*
(Continued)

*Primary Examiner* — Brent T O'Hern
(74) *Attorney, Agent, or Firm* — Oliff PLC

(57) ABSTRACT

An air-permeable packaging material which includes a non-perforated polyolefin layer having a thickness of 3 μm to 18 μm and constituted of at least one polymer selected from the group consisting of polypropylene and polyethylene and a net-shaped reinforcing layer; a package which includes the air-permeable packaging material, the non-perforated polyolefin layer facing outward, and which contains an oxygen scavenger, a desiccant, a deodorant, an insect repellent, or a fragrance; and a method for producing the package.

14 Claims, 5 Drawing Sheets

(51) Int. Cl.
*B32B 27/08* (2006.01)
*B32B 27/12* (2006.01)
*B32B 27/32* (2006.01)
*B65B 5/02* (2006.01)
*B65B 51/10* (2006.01)
*B65D 81/26* (2006.01)
*B65D 81/28* (2006.01)

(52) U.S. Cl.
CPC .............. *B32B 27/32* (2013.01); *B65B 5/022* (2013.01); *B65B 51/10* (2013.01); *B65D 81/264* (2013.01); *B65D 81/268* (2013.01); *B65D 81/28* (2013.01); *B32B 2262/0253* (2013.01); *B32B 2262/0284* (2013.01); *B32B 2262/12* (2013.01); *B32B 2307/518* (2013.01); *B32B 2307/724* (2013.01); *B32B 2439/46* (2013.01); *B32B 2553/00* (2013.01)

(58) Field of Classification Search
CPC .......... B32B 2307/724; B32B 2439/46; B32B 2553/00; B65B 5/022; B65B 51/10
USPC ........................................................ 428/35.7
See application file for complete search history.

(56) References Cited

FOREIGN PATENT DOCUMENTS

| | | | | |
|---|---|---|---|---|
| JP | H08244847 A | * | 9/1996 | |
| JP | H10-278154 A | | 10/1998 | |
| JP | 2000-254991 A | | 9/2000 | |
| JP | 2003-236964 A | | 8/2003 | |
| JP | 2003-340950 A | | 12/2003 | |
| JP | 2004-216701 A | | 8/2004 | |
| JP | 2008-000669 A | | 1/2008 | |
| JP | 2008000669 A | * | 1/2008 | |
| JP | 2016-043514 A | | 4/2016 | |
| JP | 2017-002428 A | | 1/2017 | |
| JP | 2017-177713 A | | 10/2017 | |
| JP | 2017177713 A | * | 10/2017 | ........... A23L 3/3445 |
| JP | 2018-027657 A | | 2/2018 | |

OTHER PUBLICATIONS

Translation of JP-2008000669-A (Year: 2008).*
Translation of JP-2017177713-A (Year: 2017).*
Aug. 17, 2021 Office Action issued in Japanese Patent Application No. 2018-053350.
Dec. 1, 2021 Search Report issued in Chinese Patent Application No. 201980019876.1.
May 7, 2019 International Search Report issued in International Patent Application No. PCT/JP2019/011165.

* cited by examiner

STRETCHING DIRECTION
(LENGTH DIRECTION)

← STRETCHING DIRECTION
(LENGTH DIRECTION)

← LENGTH DIRECTION

↓ WIDTH DIRECTION

AIR-PERMEABLE PACKAGING MATERIAL, AND PACKAGE AND PRODUCTION METHOD THEREFOR

Priority is claimed on Japanese Patent Application No. 2018-053350, filed Mar. 20, 2018, the content of which is incorporated herein by reference.

TECHNICAL FIELD

The present invention relates to an air-permeable packaging material, a package, and a method for producing the package.

BACKGROUND ART

Oxygen scavengers, desiccants, and the like are often used in order to prevent putrefaction, degeneration, deterioration, and the like of processed foods. Oxygen scavengers and desiccants of this type are packaged in small bags having air-permeability and then are used while being stored in outer packaging bags together with foods. Furthermore, in addition to foods, the same applies also to the packaging of contents whose quality changes due to oxidation, moisture absorption, and the like. Regarding packaging materials used for packaging oxygen scavengers or desiccants, conventionally, materials that use an air-permeable base material such as paper as a surface layer have been used. However, since the occurrence of fluffing and paper dust is unavoidable in such a surface layer, in recent years, perforated films that use nylon, polypropylene, and the like for the surface layer have been used (see, for example, Patent Literatures 1 to 3). In Patent Literatures 1 and 2, air-permeable packaging materials having a three-layer configuration are disclosed, in which a reinforcing material layer formed of a nonwoven fabric is laminated on the back surface of a base material, and a permeable film is further laminated beneath the reinforcing material layer, in order to secure mechanical strength and the overall air-permeability of the packaging material. Patent Literature 3 discloses an air-permeable packaging material formed by laminating a perforated nylon layer, a reinforcing material layer, and a perforated linear low-density polyethylene layer in this order.

CITATION LIST

Patent Literature

[Patent Literature 1]
  Japanese Unexamined Patent Application, First Publication No. 2004-216701
[Patent Literature 2]
  Japanese Unexamined Patent Application, First Publication No. 2003-340950
[Patent Literature 3]
  Japanese Unexamined Patent Application, First Publication No. 2016-043514

SUMMARY OF THE INVENTION

Problems to be Solved by the Invention

However, since the above-mentioned air-permeable packaging materials are all provided with a perforated film as an outer layer, it is necessary to carry out a perforation process after heat-laminating various layers.

Furthermore, since the above-mentioned air-permeable packaging materials are all provided with a perforated film as an outer layer, there is a risk that packaged contents such as an oxygen scavenger and a desiccant may leak.

The present invention was achieved in view of the above-described circumstances, and it is an object of the invention to provide an air-permeable packaging material having no occurrence of paper dust and fluffing and having no leakage of contents or the like; a package, and a method for producing the package.

Means for Solving the Problems

A first aspect of the present invention is an air-permeable packaging material having: a non-perforated polyolefin layer formed of at least one selected from the group consisting of polypropylene and polyethylene; and a reticulated reinforcing layer, wherein the non-perforated polyolefin layer has a thickness of 3 μm to 18 μm.

A second aspect of the present invention is a package which has the air-permeable packaging material of the first aspect used in at least a portion thereof, has the non-perforated polyolefin layer disposed on an outer side thereof, and stores an oxygen scavenger, a desiccant, a deodorant, an insect repellent, or a fragrance therein.

A third aspect of the present invention is a method for producing a package, the method including: a step of making the air-permeable packaging material according to the first aspect into a bag shape using the air-permeable packaging material in at least a portion of the package such that the reticulated reinforcing layer disposed on an inner side and both ends of the reticulated reinforcing layer come into contact with and face each other;

a step of storing an oxygen scavenger, a desiccant, a deodorant, an insect repellent, or a fragrance in the bag-shaped air-permeable packaging material; and a step of heat-sealing a peripheral edge of the bag-shaped air-permeable packaging material by a heat pressing method.

Effects of the Invention

According to the present invention, an air-permeable packaging material having no occurrence of paper dust and fluffing and having no leakage of the contents and the like; a package, and a method for producing a package can be provided.

EMBODIMENTS FOR CARRYING OUT THE INVENTION

First Embodiment

Figure 1:
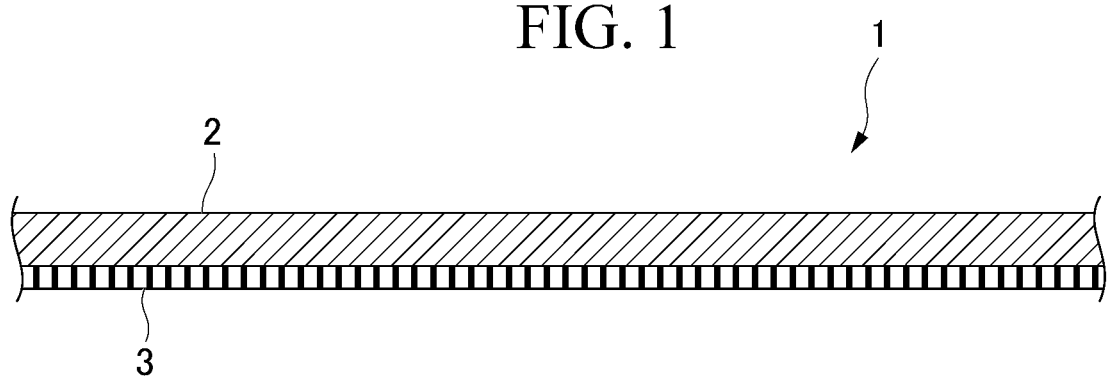
FIG. 1 is a schematic cross-sectional view illustrating an example of an air-permeable packaging material according to a first aspect of the present invention.

FIG. 1 is a schematic cross-sectional view showing an example of an air-permeable packaging material according to the present embodiment. The air-permeable packaging material 1 according to the present embodiment is used for a package that packages contents such as an oxygen scavenger and a desiccant and is housed in an outer packaging bag together with foods, and the packaging material has a non-perforated polyolefin layer 2 and a reticulated reinforcing layer 3.

Since the air-permeable packaging material 1 does not use paper as a constituent material as will be described later, the packaging material does not have the occurrence of paper dust or fluffing and has satisfactory dustproof property (lint-free).

The various layers constituting the air-permeable packaging material 1 will be described in detail below.

(Non-Perforated Polyolefin Layer)

The non-perforated polyolefin layer 2 constitutes one of the outermost surface layers of the air-permeable packaging material 1 and usually functions as a layer that comes into contact with food in the outer packaging bag. For the non-perforated polyolefin layer 2, a polypropylene film and/or a polyethylene film can be used, and the film may be a film stretched in the longitudinal direction or the transverse direction or in both directions.

In the present embodiment, the thickness of the non-perforated polyolefin layer 2 is preferably 3 μm to 18 μm, and more preferably 5 μm to 16 μm. When the thickness of the non-perforated polyolefin layer 2 is equal to or less than the upper limit value in the above-described range, sufficient air-permeability (oxygen permeation) is obtained. Furthermore, when the thickness of the non-perforated polyolefin layer 2 is equal to or more than the lower limit value in the above-described range, sufficient strength is obtained, and thus a film can be molded.

The polypropylene film and/or polyethylene film constituting the non-perforated polyolefin layer 2 can be appropriately produced by any person ordinarily skilled in the art; however, specific examples of commercially available products include a PYLEN (registered trademark) film manufactured by Toyobo Co., Ltd., and polypropylene films and/or polyethylene films manufactured by Futamura Chemical Co., Ltd.

Regarding the polyethylene film, from the viewpoint of further enhancing air-permeability (oxygen permeation), a linear low-density polyethylene (LLDPE) and/or a high-density polyethylene (HDPE) are preferred, and a linear low-density polyethylene (LLDPE) is more preferred.

A linear low-density polyethylene can be obtained by, for example, copolymerizing ethylene and an α-olefin by a production process such as a gas phase polymerization method, a slurry polymerization method, or a solution polymerization method, in the presence of a metallocene catalyst. For the copolymer, it is preferable to use an α-olefin having 4 to 12 carbon atoms. Specific examples include butene, pentene, hexene, heptene, octene, nonene, and decene.

Furthermore, if necessary, a non-perforated polyolefin layer 2 having its outermost surface subjected to a surface treatment for imparting a desired function can also be used.

Since the non-perforated polyolefin layer 2 is usually used as the outermost surface layer that does not come into contact with the inclusions, there is an advantage that it is not necessary to provide pores because the non-perforated polyolefin layer 2 itself has air-permeability, and thermo-compression bonding with the reticulated reinforcing layer 3 is possible.

Printing can be applied to the surface of the non-perforated polyolefin layer 2, which comes into contact with the reticulated reinforcing layer 3. On the non-perforated polyolefin layer 2, clear printing is enabled, and the printed information can be clearly seen even from the front surface side. Since printing is performed on the back surface of the non-perforated polyolefin layer 2, the printed portion is not exposed on the front surface of the package, and even when the package is stored with food, the printing ink does not come into contact with the food. Therefore, for the printing, inks that are generally used for printing on packaging materials, which complies with the "Voluntary Regulation Concerning Printing Inks for Food Packaging Materials" NL regulations established by the Japan Printing Ink Makers Association, can be used.

Furthermore, according to the present embodiment, the non-perforated polyolefin layer 2 usually constitutes the outermost surface layer that comes into contact with food, in the air-permeable packaging material 1. Therefore, in a case in which a package is formed using the air-permeable packaging material 1, there is no risk of leakage of the inclusions.

(Reticulated Reinforcing Layer)

The reticulated reinforcing layer 3 constitutes the outermost surface layer on the opposite side of the non-perforated polyolefin layer 2 and usually functions as a surface that comes into contact with the inclusions. The reticulated reinforcing layer 3 imparts mechanical strength to the air-permeable packaging material 1 and also secures necessary air-permeability.

The reticulated reinforcing layer 3 is not particularly limited as long as the layer has a certain strength and air-permeability originating from a reticulated structure. All materials known as so-called nonwoven fabric can be used. Examples of the nonwoven fabric include a dry nonwoven fabric, a wet method nonwoven fabric, a spun-bond nonwoven fabric, a melt-blown nonwoven fabric, a thermal bonded nonwoven fabric, a chemical bonded nonwoven fabric, a needle punched nonwoven fabric, a spunlace nonwoven fabric, a stitch bonded nonwoven fabric, and a steam jet nonwoven fabric. Examples of the material for the reticulated reinforcing layer 3 include polyethylene, polypropylene, rayon, polyester, polyamide, polyolefin, acrylic fiber, vinylon, aramid fiber, glass fiber, and cellulose fiber.

According to the present embodiment, it is preferable that the reticulated reinforcing layer 3 contains a reticulated structure in which a first fiber layer formed of a plurality of first fibers arranged in a mutually identical direction (hereinafter, may be referred to as "first direction"), and a second fiber layer formed of a plurality of second fibers arranged in a direction different from the direction of the first fibers (hereinafter, may be referred to as "second direction") and in a mutually identical direction, are laminated or woven together. Here, the terms first fiber layer and second fiber layer can be used interchangeably without being distinguished. In a case in which fiber layers having different features are laminated as a first fiber layer and a second fiber layer, there are no limitations on which fiber layer will come into contact with the non-perforated polyolefin layer 2. Regarding such a reticulated structure, various forms may be mentioned and there are no particular limitations; however, those having a certain strength and air-permeability originating from the reticulated structure are preferred.

In a case in which the reticulated reinforcing layer 3 contains the-above-described reticulated structure, it is preferable because the tensile strength and the puncture strength of the air-permeable packaging material 1 are enhanced.

A plurality of the first fibers constituting the reticulated structure may be a plurality of fibers constituting a first uniaxially stretched reticulated film that has been uniaxially stretched in the above-described first direction (that is, fibers constituting the first uniaxially stretched reticulated film), or a plurality of stretched fibers (group of stretched fibers) each being stretched in the axial direction and also arranged along the first direction. Similarly, a plurality of the second fibers constituting the reticulated structure may be a plurality of fibers constituting the second uniaxially stretched reticulated film that has been uniaxially stretched in the above-described second direction (that is, fibers constituting the second uniaxially stretched reticulated film), or a plurality of stretched fibers (group of stretched fibers) each being stretched in the axial direction and also arranged along the second direction.

The uniaxially stretched reticulated film is a film having a uniaxially stretched reticulated structure, and includes a split fiber film that is uniaxially stretched, in which a split-woven multilayer film is expanded in a direction orthogonal to the stretching direction at a plurality of sites (hereinafter, referred to as "split web"), and a reticulated film in which a multilayer film having a plurality of slits is uniaxially stretched (hereinafter, referred to as "slit web"). It is preferable that the multilayer film has a multilayer structure in which a second thermoplastic resin layer (adhesive layer) is laminated on at least one face of a first thermoplastic resin layer, and it is more preferable that the multilayer film has a three-layer structure in which a second thermoplastic resin layer (adhesive layer) is laminated on both faces of a first thermoplastic resin layer.

The first thermoplastic resin layer and the second thermoplastic resin layer are resin layers each containing a thermoplastic resin as a main component. Examples of the thermoplastic resin include polyolefins such as polyethylene and polypropylene, and copolymers thereof, all of which have satisfactory fiber splittability. Furthermore, the difference in the melting point between the thermoplastic resin that constitutes the first thermoplastic resin layer (hereinafter, referred to as "first thermoplastic resin") and the thermoplastic resin that constitutes the second thermoplastic resin layer (hereinafter, referred to as "second thermoplastic resin") needs to be 5° C. or higher, and preferably 10° C. to 50° C., for a reason related to manufacture.

It is preferable that the first fibers and the second fibers are adhered to each other by using the second thermoplastic resin layer as an adhesive layer.

Furthermore, according to the present embodiment, in a case in which the non-perforated polyolefin layer is formed of polyethylene, and the polyethylene is a linear low-density polyethylene, it is preferable that the reticulated structure is formed of polyethylene, and the polyethylene is a linear low-density polyethylene.

Furthermore, according to the present embodiment, in a case in which the non-perforated polyolefin layer is formed of polypropylene, it is preferable that the reticulated structure is formed of polypropylene.

Hereinafter, some embodiments of the reticulated structure will be described.

(First Reticulated Structure)

Figure 2:
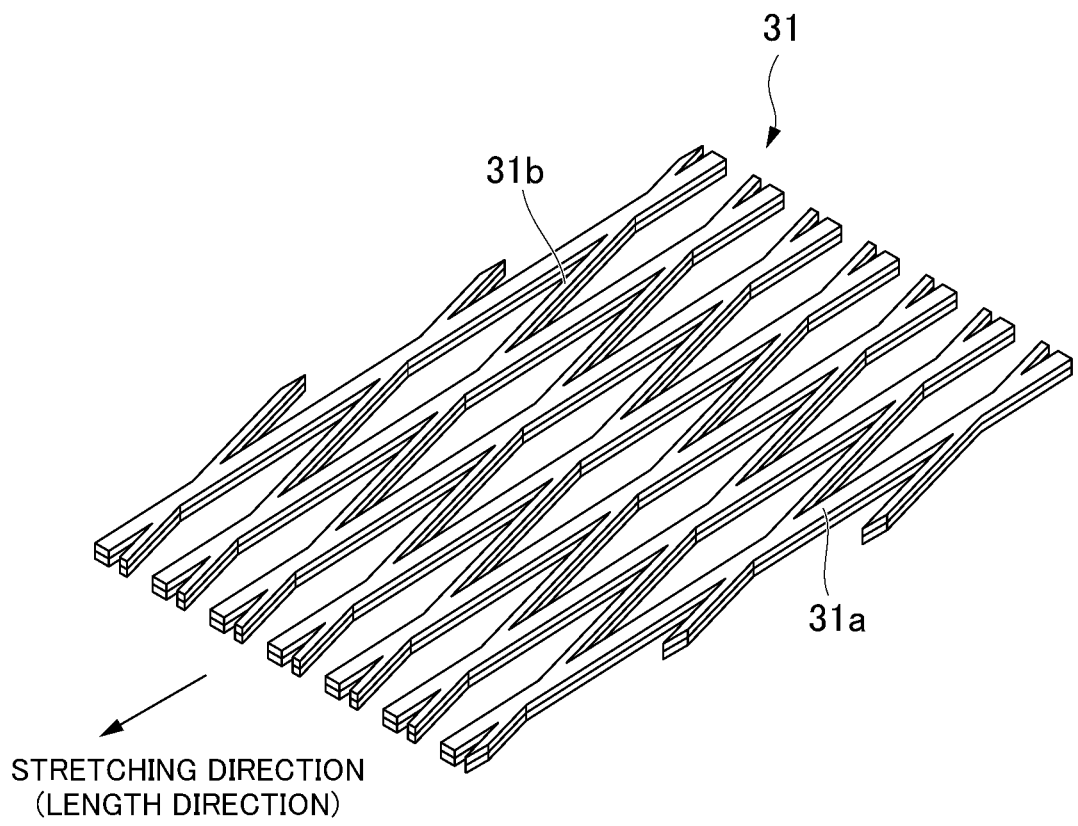
FIG. 2 is a diagram illustrating an example of a uniaxially stretched reticulated film (split web) constituting a reticulated structure.

A first reticulated structure is a laminated nonwoven fabric in which a split web as the uniaxially stretched reticulated film and a slit web as the uniaxially stretched reticulated film are laminated and adhered such that their stretching directions approximately orthogonally intersect each other. FIG. 2 shows the split web, FIG. 3 shows the slit web, and FIG. 4 shows the first reticulated structure.

The split web 31 can be formed by uniaxially stretching a multilayer film in the length direction (longitudinal direction), splitting the fibers (for example, splitting in a staggered form) at a plurality of sites along the longitudinal direction that is the stretching direction, and then expanding (widening) the fibers in the transverse direction (width direction) that orthogonally intersects the stretching direction. Here, it is preferable that the multilayer film has a three-layer structure in which the second thermoplastic resin layer is laminated on both faces of the first thermoplastic resin, as described above. As shown in FIG. 2, the split web 31 has a network-like structure and as its constituent fibers, the split web has a plurality of stem fibers 31a that extend in the stretching direction and are almost parallel to one another; and branch fibers 31b that connect between adjacent stem fibers 31a. By uniaxially stretching the multilayer film, the molecules constituting the multilayer film are oriented in the stretching direction. As a result, the split web 31 has a relatively high strength in the length direction (longitudinal direction), which is the stretching direction (direction of orientation of constituent molecules).

The slit web 32 can be formed by forming a plurality of slits (for example, forming slits in a staggered form) that extend in the width direction (transverse direction) in a multilayer film, and then stretching the multilayer film in the width direction (transverse direction). As described above, the multilayer film has a three-layer structure in which the second thermoplastic resin layer is laminated on both faces of the first thermoplastic resin. As shown in FIG. 3, it is preferable that the slit web 32 has a rhombic-shaped network-like structure. By uniaxially stretching the multilayer film, the molecules constituting the multilayer film are oriented in the stretching direction, and as a result, the slit web 32 has relatively high strength in the width direction (transverse direction), which is the stretching direction (direction of orientation of constituent molecules).

Figure 3:
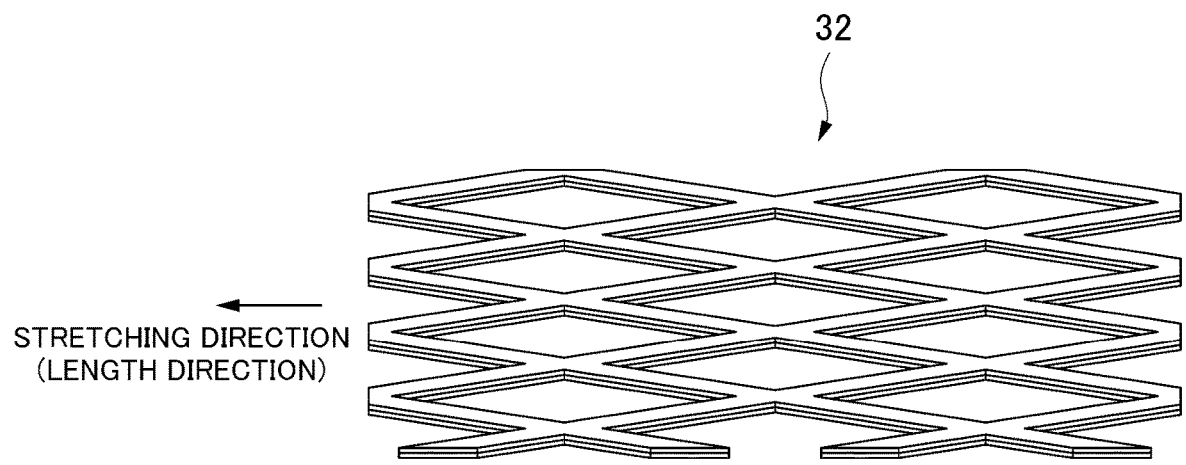
FIG. 3 is a diagram illustrating another example of a uniaxially stretched reticulated film (slit web) constituting a reticulated structure.
Figure 4:
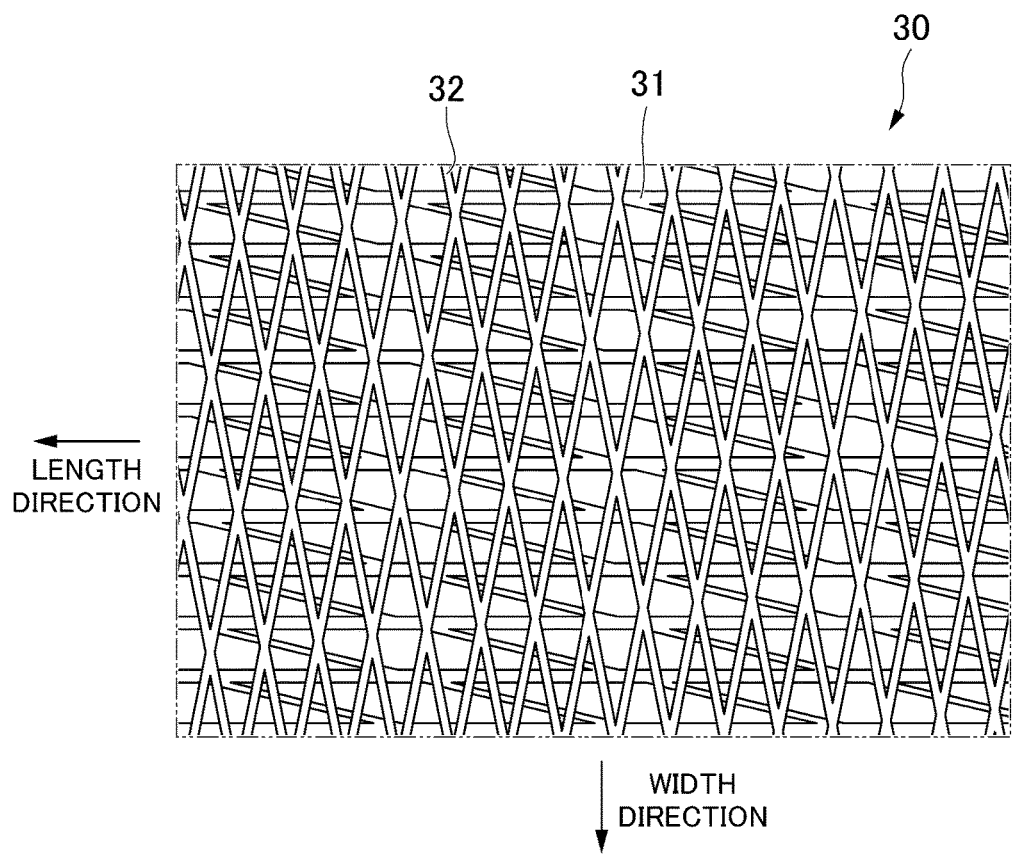
FIG. 4 is a diagram illustrating an example of a reticulated structure.

The first reticulated structure 30 is formed by laminating the split web 31 shown in FIG. 2 and the slit web 32 shown in FIG. 3 such that their stretching directions approximately orthogonally intersect each other as shown in FIG. 4, and then adhering the webs by thermocompression bonding. Various characteristics of the first reticulated structure, such as the basis weight, the constituent fiber size (thickness and width), and tensile strength, can be controlled by appropriately adjusting the thickness of the first thermoplastic resin layer of the multilayer film, the stretch ratio, the splitting site in the split web 31, the slit forming site in the slit web 32, and the like. Incidentally, in the first reticulated structure, the fiber group constituting the split web 31, mainly a stem fiber 31a group, corresponds to the plurality of first fibers, and the fiber group constituting the slit web 32 corresponds to the plurality of second fibers.

(Second Reticulated Structure)

Figure 5:
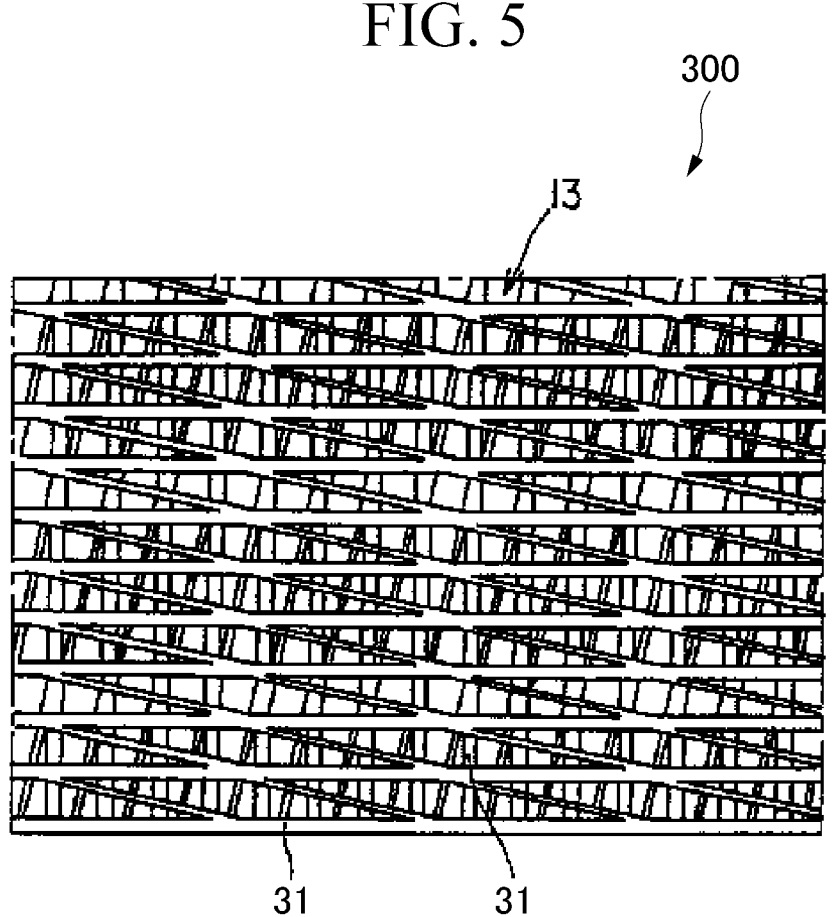
FIG. 5 is a diagram illustrating another example of the reticulated structure.

As shown in FIG. 5, a second reticulated structure 300 is a laminated nonwoven fabric formed of a reticulated base material 13 in which the split webs 31 shown in FIG. 2 are laminated and adhered such that their stretching directions approximately orthogonally intersect each other. Various characteristics of the second reticulated structure, such as the basis weight, the size (thickness and width) of the constituent fibers, and tensile strength, can be controlled by appropriately adjusting the thickness of the first thermoplastic resin layer of the multilayer film, the stretch ratio, splitting site in the split web 31, and the like. Incidentally, in the second reticulated structure, the fiber group constituting one of the split webs 31, mainly a stem fiber 31a group, corresponds to the plurality of first fibers, and the fiber group constituting the other split web 31, mainly a stem fiber 31a group, corresponds to the plurality of second fibers.

(Third Reticulated Structure)

A third reticulated structure is a laminated nonwoven fabric in which a first stretched fiber group formed of a plurality of stretched fibers, each being stretched in the axial direction and arranged along the first direction, and a second stretched fiber group formed of a plurality of stretched fibers, each being stretched in the axial direction and arranged along the second direction, are laminated and adhered. The stretched fibers can be formed by, for example, uniaxially stretching a multilayer tape having a configuration similar to the multilayer film, in the length direction (longitudinal direction). Incidentally, in the third reticulated structure, a plurality of stretched fibers constituting the first stretched fiber group corresponds to the plurality of first fibers, and a plurality of stretched fibers constituting the second stretched fiber group corresponds to the plurality of second fibers.

(Fourth Reticulated Structure)

A fourth reticulated structure is a woven fabric that is woven by any arbitrary weaving method such that a plurality of stretched fibers constituting the first stretched fiber group serves as warps and a plurality of stretched fibers constituting the second stretched fiber group serves as wefts, and then has the first stretched fiber group and the second stretched fiber group integrated by adhesion or the like. Incidentally, in the fourth reticulated structure, a plurality of stretched fibers that constitutes the first stretched fiber group corresponding to the warps corresponds to the plurality of first fibers, and a plurality of stretched fibers that constitutes the second stretched fiber group corresponding to wefts corresponds to the plurality of second fibers.

(Fifth Reticulated Structure)

A fifth reticulated structure is a laminated nonwoven fabric in which, for example, the split web 31 shown in FIG. 2 and a stretched fiber group formed of a plurality of stretched fibers are laminated and adhered. The fifth reticulated structure can have, for example, a three-layer configuration in which a split web 31 and the second stretched fiber group are laminated and adhered, or a three-layer configuration in which the second stretched fiber group is laminated and adhered to both faces of a split web 31. Incidentally, in the fifth reticulated structure, a fiber group constituting a split web 31, mainly a stem fiber 31a group, corresponds to the plurality of first fibers, and a plurality of stretched fibers constituting the second stretched fiber group corresponds to the plurality of second fibers.

(Sixth Reticulated Structure)

According to still another embodiment, the reticulated structure is a nonwoven fabric formed by warp-weft laminating longitudinally uniaxially stretched multilayer polyolefin tapes, or a woven fabric formed by weaving the tapes. That is, both the first fiber layer and the second fiber layer are composed of a plurality of longitudinally uniaxially stretched multilayer polyolefin tape groups. In the case of a nonwoven fabric, a plurality of longitudinally uniaxially stretched multilayer polyolefin tape groups is warp-weft laminated such that the stretching directions approximately orthogonally intersect each other, and is welded or adhered. In the case of a woven fabric, a plurality of longitudinally uniaxially stretched multilayer polyolefin tape groups and a plurality of longitudinally uniaxially stretched multilayer polyolefin tape groups are woven by any arbitrary weaving method such that the former tape group serves as warps and the latter longitudinally uniaxially stretched multilayer polyolefin tape group serves as wefts (as a result of being disposed so as to serve as wefts, the direction of orientation of the polyolefin tapes becomes a direction at a right angle with respect to the warps), and are welded or adhered.

A longitudinally uniaxially stretched multilayer polyolefin tape can be produced by producing a raw film having a three-layer structure by extrusion molding such as a multilayer inflation method or a multilayer T-die method, uniaxially stretching the raw film in the longitudinal direction at a stretch ratio of 1.1 to 15 times, and preferably 3 to 10 times, and then cutting the stretched film along the stretching direction at a width of, for example, 2 mm to 7 mm. Alternatively, similarly, a longitudinally uniaxially stretched tape can be produced by producing a raw film having a three-layer structure, cutting the raw film at the same width in the machine direction, and then uniaxially stretching the raw film at a stretch ratio of 1.1 to 15 times, preferably 3 to 10 times in the machine direction.

Figure 6:
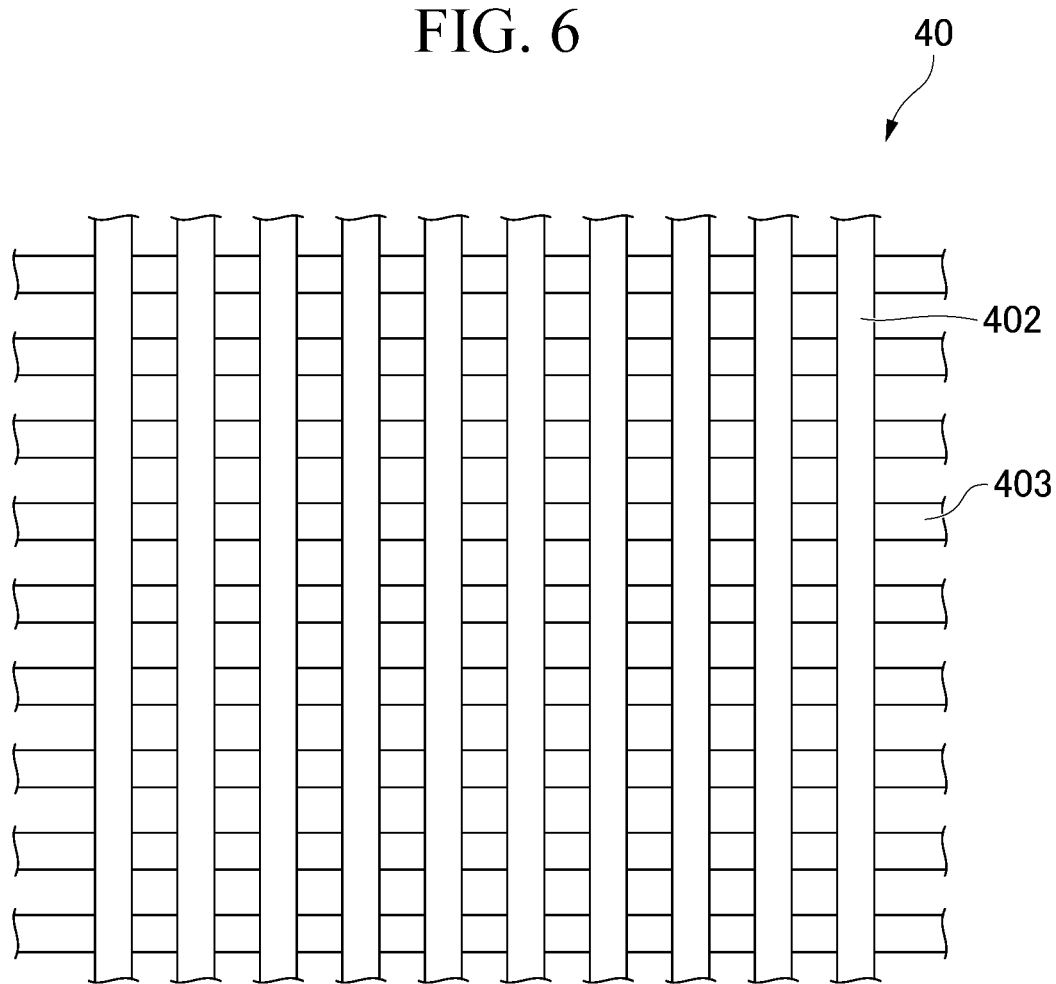
FIG. 6 is a diagram illustrating another example of the reticulated structure.

FIG. 6 shows an example of a reticulated structure formed from a nonwoven fabric. In FIG. 6, the reticulated structure 40 is a reticulated structure produced by arraying a plurality of uniaxially stretched multilayer tapes corresponding to warps arranged in parallel at a regular interval as a first fiber layer 402, and laminating another plurality of uniaxially stretched multilayer tapes corresponding to wefts as a second fiber layer 403 such that the longitudinal direction of the latter uniaxially stretched multilayer tapes approximately orthogonally intersect the former uniaxially stretched multilayer tapes. Then, the contact surfaces between the warps and the wefts are heat-welded, and thereby a reticulated structure is obtained. In this case, the mode of heat welding or adhesion is similar to that of the above-mentioned embodiment. Regarding a woven fabric, it can be produced in the same manner except that a plurality of uniaxially stretched multilayer tapes are woven instead of being laminated.

Regarding an example of a commercially available product of such a nonwoven fabric, SOF (trade name) HN55 and HN66 manufactured by Sekisui Film Co., Ltd. can be utilized. Regarding an example of a commercially available woven fabric, MELTAC (trade name) manufactured by Hagiwara Industries, Inc. and the like can also be utilized.

[Seventh Reticulated Structure: Various Laminated Bodies]

For the reticulated reinforcing layer 3, a laminated body in which the above-mentioned split fiber film (longitudinal web) or a reticulated film (transverse web) and a longitudinally uniaxially stretched multilayer polyolefin tape are laminated such that the stretching directions approximately orthogonally intersect or obliquely intersect each other, or a woven fabric or nonwoven fabric in which filaments spun from a thermoplastic resin and stretched are combined such that the stretching directions approximately orthogonally intersect each other, can also be used. In short, a configuration in which a plurality of reticulated body layers are integrated such that the stretching directions thereof approximately orthogonally intersect or obliquely intersect each other, and so as to have air-permeability, is desirable.

(Modification Example of Air-Permeable Packaging Material)

Figure 7:
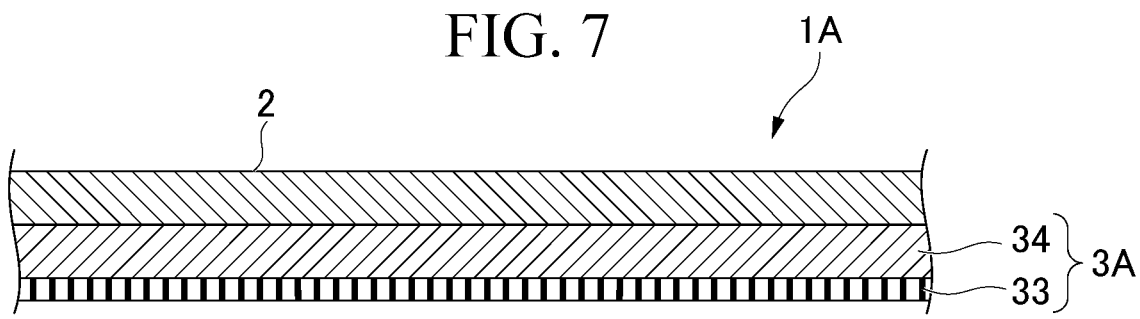
FIG. 7 is a schematic cross-sectional view illustrating a modification example of the air-permeable packaging material according to the first aspect of the present invention.

FIG. 7 is a schematic cross-sectional view showing a modification example of the air-permeable packaging material according to the present embodiment. In the modification example shown in FIG. 7, the air-permeable packaging material 1A has a non-perforated polyolefin layer 2 and a reticulated reinforcing layer 3A. The reticulated reinforcing layer 3A has a nonwoven fabric 34 other than a reticulated structure (hereinafter, referred to as "nonwoven fabric 34") and a layer 33 formed from a reticulated structure (hereinafter, referred to as "reticulated structure layer 33"). In the modification example shown in FIG. 7, the non-perforated polyolefin layer 2, the nonwoven fabric 34, and the reticulated structure layer 33 are laminated in this order from the top.

Figure 8:
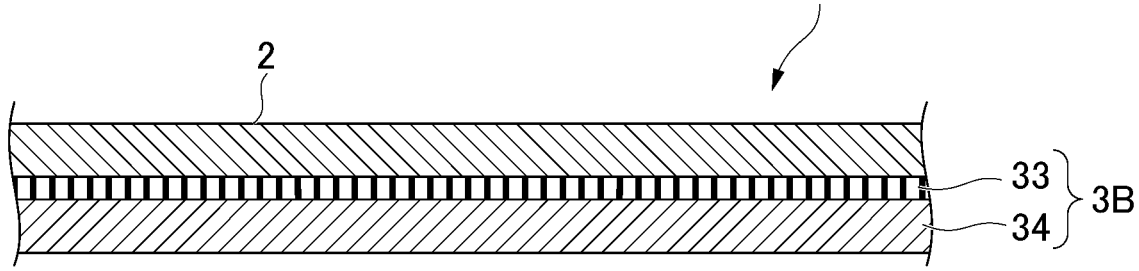
FIG. 8 is a schematic cross-sectional view illustrating another modification example of the air-permeable packaging material according to the first aspect of the present invention.

FIG. 8 is a schematic cross-sectional view showing another modification example of the air-permeable packaging material according to the present embodiment. In the modification example shown in FIG. 8, the air-permeable packaging material 1B has a non-perforated polyolefin layer 2 and a reticulated reinforcing layer 3B. The reticulated reinforcing layer 3B has a reticulated structure layer 33 and a nonwoven fabric 34. In the modification example shown in FIG. 8, the non-perforated polyolefin layer 2, the reticulated structure layer 33, and the nonwoven fabric 34 are laminated in this order from the top.

In the modification example shown in FIGS. 7 and 8, the mesh of the reticulated structure layer 33 can be coarsened and reinforced with the nonwoven fabric 34.

In the modification example shown in FIGS. 7 and 8, a perforated film 34' may be laminated instead of the nonwoven fabric 34. By using the perforated film 34', the air-permeability of the air-permeable packaging material can be further increased.

(Method for Producing Air-Permeable Packaging Material)

Next, the air-permeable packaging material according to the present embodiment will be described from the viewpoint of the production method. The method for producing the air-permeable packaging material includes a step of joining the non-perforated polyolefin layer 2 and the reticulated reinforcing layer 3 by a thermocompression bonding method. Joining of these layers can be carried out at once by a thermocompression bonding method after the respective layers are individually produced, and the air-permeable packaging material 1 according to the present invention can be obtained by such a step. In this case, regarding the conditions for thermocompression bonding, for example, temperature conditions of 120° C. to 140° C., and preferably 125° C. to 140° C., and pressure conditions of a linear pressure of 150 to 260 N/cm, and preferably a linear pressure of 200 to 250 N/cm, can be employed. A specific thermocompression bonding method can be carried out using a steam heating roll or a dielectric heating roll; however, the method is not limited to these methods.

In the present embodiment, the non-perforated polyolefin layer 2 and the reticulated reinforcing layer 3 may be joined by wire laminating. In this case, for example, a T-die for extrusion lamination is furnished with a lip having perforations of 2 mmφ disposed at an interval of 1 mm, a molten resin is extruded through the perforations in a striped form, and then a different material can be laminated thereon. In a case in which the non-perforated polyolefin layer 2 and the reticulated reinforcing layer 3 are joined by wire laminating, since the surface of the reticulated reinforcing layer 3 is in a striped form, the layers can be bonded without impairing air-permeability.

The air-permeable packaging material obtainable in the present embodiment is usually in the form of a flexible film having a film thickness of about 100 to 300 μm, and preferably about 100 to 200 μm. Since the air-permeable packaging material 1 according to the present embodiment does not use paper as a constituent material, there is no occurrence of paper dust and fluffing, and the dustproof property is satisfactory (lint-free).

Furthermore, in the air-permeable packaging material 1 according to the present embodiment, printing can be applied to the surface of the non-perforated polyolefin layer 2, which comes into contact with the reticulated reinforcing layer 3. In that case, since printing is performed on the back surface of the non-perforated polyolefin layer 2, the printed portion is not exposed on the front surface of the package, and even when inclusions such as food are stored in the package, the printing ink does not come into contact with the inclusions. Furthermore, coming off, transfer, and the like of the printing ink can be prevented.

The air-permeable packaging material 1 according to the present embodiment includes a reticulated reinforcing layer 3 such as described above. Therefore, an air-permeable packaging material 1 having excellent mechanical strength such as tensile strength similar to the prior art technologies can be obtained. Furthermore, in a case in which the reticulated reinforcing layer 3 contains a reticulated structure, the strength balance in the longitudinal direction and the transverse direction is excellent, and moreover, the tensile strength, the puncture strength, and the air-permeability can be further enhanced.

Furthermore, the second thermoplastic resin layer (adhesive layer) of the reticulated reinforcing layer 3 functions as a heat-seal layer. Therefore, the air-permeable packaging material 1 according to the present embodiment does not need to be provided with a separate heat-seal layer, and since the number of steps can be reduced, it is also advantageous in view of production cost.

Furthermore, in the air-permeable packaging material 1 according to the present embodiment, since the non-perforated polyolefin layer 2 itself has air-permeability, it is not necessary to provide perforations. Therefore, in the air-permeable packaging material 1 according to the present embodiment, there is no risk of leakage of the inclusions.

Since the air-permeable packaging material 1 according to the present embodiment includes the above-described layer structure, the air-permeable packaging material conforms to the 4% acetic acid elution residue test in the standards and criteria for foods, additives, and the like (S34 Ministry of Health and Welfare Notification No. 370) based on the Food Sanitation Act. Specifically, the air-permeable packaging material 1 according to the present embodiment satisfies an evaporation residue of "30 μg/ml or less" as defined by the above-described standards and criteria. The amount of the evaporation residue of the air-permeable packaging material 1 according to the present embodiment is more preferably 10 μg/ml or less, even more preferably 5 μg/ml or less. Since the air-permeable packaging material conforms to these criteria, the air-permeable packaging material can be used as, for example, a packaging material for a desiccant or the like that is included in food packaging.

Second Embodiment

Figure 9:
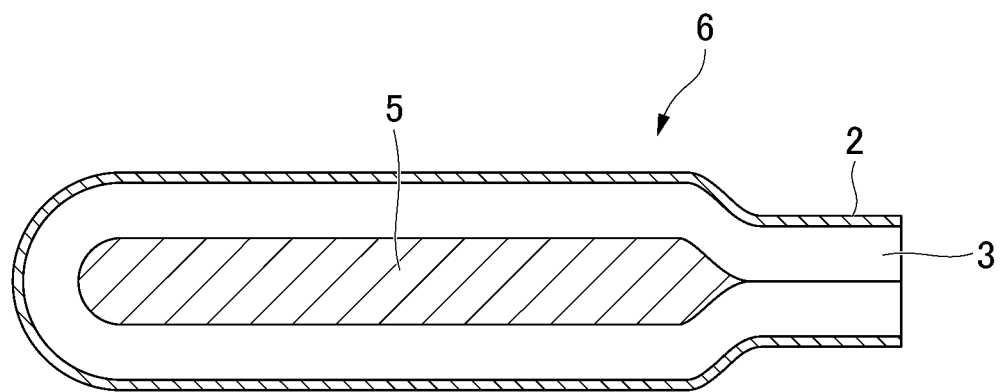
FIG. 9 is a schematic sectional view illustrating an example of a package according to a second aspect of the present invention.

A second embodiment according to the present invention is shown in FIG. 9.

FIG. 9 is a schematic cross-sectional view showing an example of the package according to the present embodiment. The package 6 according to the present embodiment is a package obtained by forming the air-permeable packaging material 1 according to the first embodiment into a bag shape such that the reticulated reinforcing layer 3 comes to the inner side, and housing a functional article 5 such as a desiccant, a deodorant, an insect repellent, or a fragrance therein.

When the package 6 is produced from the air-permeable packaging material 1, the second thermoplastic resin layer (adhesive layer) of the reticulated reinforcing layer 3 functions as a heat-seal layer. Therefore, it is not necessary to provide a separate sealing layer in the air-permeable packaging material 1. Specifically, the air-permeable packaging material 1 is folded into a bag shape with the reticulated reinforcing layer 3 on the inner side such that both ends of the reticulated reinforcing layer 3 come into contact facing each other, a functional article 5 is wrapped therein, and the peripheral edge is heat-sealed by a heat pressing method. Thereby, the functional article 5 is hermetically sealed so as not to be discharged to the outside of the package.

According to the present embodiment, the functional article 5 that comes into contact with the reticulated reinforcing layer 3 is such that the particle size is preferably 600 μm or more, and particularly preferably 1,000 μm or more. As an example, the size of silica gel, which is an object of packaging for which the air-permeable packaging material according to the present embodiment is preferably used, is usually 7 to 12 mesh (particle size 2.83 to 1.40 mm), or 5 to 8 mesh (particle size 4.00 to 2.36 mm); however, the invention is not limited to these sizes. This is to prevent the silica gel from being discharged through the perforations of the reticulated reinforcing layer 3 to the outside. Specific examples of the functional article 5 include silica, zeolite, and activated carbon, and silica as a desiccant is particularly preferable; however, the functional article is not limited to these.

As described above, the air-permeable packaging material 1 is provided with the non-perforated polyolefin layer 2 as an outer layer. Therefore, when the package 6 is formed using the air-permeable packaging material 1, since the surface layer of the package 6 is the non-perforated polyolefin layer 2, paper dust is not generated as in the conventional cases, and it is hygienic. Furthermore, since the surface layer of the package 6 is non-perforated, there is no risk of leakage of the inclusions such as a powder of the functional article 5 stored inside. In addition, since the surface layer of the package 6 is the non-perforated polyolefin layer 2, the air-permeable packaging material 1 has excellent oil resistance.

Also, the air-permeable packaging material 1 includes a reticulated reinforcing layer 3. As described above, particularly in a case in which the reticulated reinforcing layer 3 contains a reticulated structure, the strength balance in the longitudinal direction and the transverse direction is also excellent, and the tensile strength, puncture strength, and air-permeability can be further enhanced. Therefore, when the package 6 is formed using the air-permeable packaging material 1, any damage caused by the functional article 5 stored inside is not likely to occur, and the air-permeable packaging material can be effectively utilized even as a large-sized packaging material for storing heavy functional articles 5 such as activated carbon and charcoal, in addition to a desiccant.

Furthermore, when the package 6 is formed, since the second thermoplastic resin layer of the reticulated reinforcing layer 3 functions as a heat-seal layer, so that the second thermoplastic resin layer is fused at a relatively low temperature. Therefore, the heat-sealing time can be shortened, and since the filling speed for the functional article 5 can be increased concomitantly therewith, the productivity of the package 6 can be enhanced. Furthermore, the package 6 according to the present embodiment does not need to be provided with a separate heat-seal layer, and since the number of steps can be reduced, it is also advantageous in view of production cost.

In the package 6 according to the present embodiment, printing can be applied to the surface of the non-perforated polyolefin layer 2, which comes into contact with the reticulated reinforcing layer 3. In that case, since the printing is performed on the back surface of the non-perforated polyolefin layer 2, the printed portion is not exposed on the front surface of the package, and even when inclusions such as food are stored in the package 6, the printing ink does not come into contact with the food. Furthermore, coming off, transfer, and the like of the printing ink can be prevented.

The air-permeable packaging material of the present invention can be suitably utilized for the packaging of a desiccant; however, the air-permeable packaging material can also be suitably utilized for the packaging of functional articles 5 such as a fragrance, a deodorant, and an insect repellent. The package that stores these functional articles 5 may be in any form as long as the functional articles 5 can function. In a case in which the package is in the form of a bag, the air-penneable packaging material is used in a portion, one surface, or the entirety of the bag. Regarding a heat-sealing method for an air-permeable packaging material for forming a package, a heat pressing method using a heat seal bar is generally used. Therefore, in a case in which the package is in the form of a bag, a general bag-making packaging machine for forming a bag from a sheet material can be used. Furthermore, since the air-permeable packaging material of the present invention has excellent tensile strength as described above, the air-permeable packaging material can also be utilized as a large-sized package or a sheet-shaped package.

EXAMPLES

Next, the present invention will be described in more detail by way of Examples; however, the present invention is not intended to be limited to these examples. The various values in Examples and Comparative Examples were determined by the following methods.

Production Example 1 of Reticulated Structure

A reticulated structure (second reticulated structure 300) in which a split web 31 and a split web 31 were laminated and adhered such that the stretching directions thereof would approximately orthogonally intersect each other, was produced. With regard to the split web 31, in a main layer of the multilayer film, resin A was used for a certain first thermoplastic resin layer, and resin B was laminated as a second thermoplastic resin layer (adhesive layer) on both faces of the first thennoplastic resin layer by a water cooled impression method. Then, the split web 31 and the split web 31 were adhered by heat welding, and a reticulated structure (3-1) was obtained.

Resins A and B are as follows.

Resin A: Polypropylene PL400A (manufactured by SunAllomer, Ltd.)

Resin B: Polypropylene FX4ET (manufactured by Japan Polypropylene Corporation)

Production Example 2 of Reticulated Structure

A reticulated structure (3-2) was obtained in the same manner as in Production Example 1, except that the following resin C was used instead of the resin A, and the following resin D was used instead of the resin B.

Resin C: High-density polyethylene HY444 (manufactured by Japan Polyethylene Corporation)

Resin D: Low-density polyethylene LE541H (manufactured by Japan Polyethylene Corporation)

Example 1

An air-permeable packaging material according to the first embodiment of the present invention was produced. A biaxially stretched non-perforated polypropylene film having a layer thickness of 6 μm was used as a non-perforated polypropylene layer. Necessary printing such as a product logo was applied by gravure printing to one surface of this non-perforated polypropylene film. The reticulated structure (3-1) was used as a reticulated reinforcing layer.

With the printed layer of the non-perforated polypropylene layer disposed on the inside, the two layers were simultaneously passed between hot rolls so as to come into contact with the printed layer while the reticulated reinforcing layer was subjected to a corona treatment, and thus an air-permeable packaging material was produced. The lamination conditions were set as follows: the temperature of the hot rolls was 135° C., the linear pressure was 200 N/cm, and the feeding speed was 20 m/min. The non-perforated polypropylene layer side was brought into contact with the hot rolls. The corona treatment was performed at an output of 100 W/(m²·min.).

Example 2

An air-permeable packaging material according to the first embodiment of the present invention was produced. A biaxially stretched non-perforated polypropylene film having a layer thickness of 12 μm was used as a non-perforated polypropylene layer. Necessary printing such as a product logo was applied by gravure printing to one surface of this non-perforated polypropylene film. As a reticulated reinforcing layer, the reticulated structure (3-1) and a core-sheath nonwoven fabric (core: PET, sheath: nonwoven fabric made of PE with a basis weight of 20 g/m²) were used.

With the printed layer of the non-perforated polypropylene layer disposed on the inside, while the reticulated structure (3-1) was subjected to a corona treatment, the core-sheath nonwoven fabric was further fed out simultaneously such that the core-sheath nonwoven fabric was brought into contact with the printed layer, the three layers were simultaneously passed between hot rolls, and thus an air-permeable packaging material was produced. The lamination conditions were set as follows: the temperature of the hot rolls was 135° C., the linear pressure was 200 N/cm, and the feeding speed was 20 m/min. The non-perforated polypropylene layer side was brought into contact with the hot rolls. The corona treatment was performed at an output of 100 W/(m²·min.).

Example 3

An air-permeable packaging material according to the first embodiment of the present invention was produced. A non-perforated linear low-density polyethylene film having a layer thickness of 15 μm was used as a non-perforated polyethylene layer. Necessary printing such as a product logo was applied by gravure printing to one surface of this non-perforated linear low-density polyethylene film. As a reticulated reinforcing layer, the reticulated structure (3-2) and a core-sheath nonwoven fabric (core: PET, sheath: nonwoven fabric made of PE with a basis weight of 20 g/m²) were used.

With the printed layer of the non-perforated polyethylene layer disposed on the inside, while the reticulated structure (3-2) was subjected to a corona treatment, the core-sheath nonwoven fabric was further fed out simultaneously such that the core-sheath nonwoven fabric was brought into contact with the printed layer, the three layers were simultaneously passed between hot rolls, and thus an air-permeable packaging material was produced. The lamination conditions were set as follows: the temperature of the hot rolls was 125° C., the linear pressure was 200 N/cm, and the feeding speed was 20 m/min. The non-perforated polyethylene layer side was brought into contact with the hot rolls. The corona treatment was performed at an output of 100 W/(m²·min.).

Comparative Example 1

An air-permeable packaging material for comparison was produced. A perforated PET film having a layer thickness of 12 μm was used as the outermost layer. This perforated PET film is obtained by applying necessary printing such as a product logo by gravure printing on one surface of a PET film, applying LDPE by extrusion lamination, and perforating a laminated film thus obtained. As a reticulated reinforcing layer, the reticulated structure (3-2) and a microporous film (40 g/m²) were used.

With the printed layer of the perforated PET layer disposed on the inside, while the reticulated structure (3-2) was subjected to a corona treatment, the microporous film was further fed out simultaneously such that the non-perforated MPF was brought into contact with the printed layer, the three layers were simultaneously passed between hot rolls, and thus an air-permeable packaging material was produced. The lamination conditions were set as follows: the temperature of the hot rolls was 125° C., the linear pressure was 200 N/cm, and the feeding speed was 20 m/min. The perforated PET layer side was brought into contact with the hot rolls. The corona treatment was performed at an output of 100 W/(m²·min.).

Comparative Example 2

An air-permeable packaging material for comparison was produced. A perforated PET film having a layer thickness of 12 μm was used as the outermost layer. Necessary printing such as a product logo was applied by gravure printing to one surface of this perforated PET film. As a reticulated reinforcing layer, the reticulated structure (3-2) and a linear low-density polyethylene film having a layer thickness of 20 μm were used.

With the printed layer of the perforated PET layer disposed on the inside, while the reticulated structure (3-2) was subjected to a corona treatment, the linear low-density polyethylene film was further fed out simultaneously such that the linear low-density polyethylene film was brought into contact with the printed layer, the three layers were simultaneously passed between hot rolls, and thus an air-permeable packaging material was produced. The lamination conditions were set as follows: the temperature of the hot rolls was 125° C., the linear pressure was 200 N/cm, and the feeding speed was 20 m/min. The perforated PET layer side was brought into contact with the hot rolls. The corona treatment was performed at an output of 100 W/(m²·min.).

Comparative Example 3

An air-permeable packaging material for comparison was produced. A linear low-density polyethylene film having a layer thickness of 20 μm was used as the non-perforated polyethylene layer. Necessary printing such as a product logo was applied by gravure printing to one surface of this linear low-density polyethylene film. As a reticulated reinforcing layer, the reticulated structure (3-2) and a core-sheath nonwoven fabric (core: PET, sheath: nonwoven fabric made of PE with a basis weight of 20 g/m²) were used.

With the printed layer of the non-perforated polyethylene layer disposed on the inside, while the reticulated structure (3-2) was subjected to a corona treatment, the core-sheath nonwoven fabric was further fed out simultaneously such that the core-sheath nonwoven fabric was brought into contact with the printed layer, the three layers were simultaneously passed between hot rolls, and thus an air-permeable packaging material was produced. The lamination conditions were set as follows: the temperature of the hot rolls was 125° C., the linear pressure was 200 N/cm, and the feeding speed was 20 m/min. The non-perforated polyethylene layer side was brought into contact with the hot rolls. The corona treatment was performed at an output of 100 W/(m²·min.).

Comparative Example 4

An air-permeable packaging material for comparison was produced. A biaxially stretched polypropylene film having a layer thickness of 40 μm was used as a non-perforated polypropylene layer. Necessary printing such as a product logo was applied by gravure printing to one surface of this polypropylene film. As a reticulated reinforcing layer, the reticulated structure (3-1) and a core-sheath nonwoven fabric (core: PET, sheath: nonwoven fabric made of PE with a basis weight of 20 g/m²) were used.

With the printed layer of the non-perforated polypropylene layer disposed on the inside, while the reticulated structure (3-1) was subjected to a corona treatment, the core-sheath nonwoven fabric was further fed out simultaneously such that the core-sheath nonwoven fabric was brought into contact with the printed layer, the three layers were simultaneously passed between hot rolls, and thus an air-permeable packaging material was produced. The lamination conditions were set as follows: the temperature of the hot rolls was 135° C., the linear pressure was 200 N/cm, and the feeding speed was 20 m/min. The non-perforated polypropylene layer side was brought into contact with the hot rolls. The corona treatment was performed at an output of 100 W/(m²·min.).

(Evaluation of Oxygen Permeation)

Each of the air-permeable packaging materials obtained in Examples 1 to 3 and Comparative Examples 1 to 4 was filled with an oxygen scavenger (5 g). Each air-permeable packaging material filled with an oxygen scavenger was put into a barrier bag and hermetically sealed with 500 ml of air, the oxygen concentration was measured every hour, and the oxygen permeation was evaluated according to the following criteria.

(Evaluation Criteria)

A: The oxygen concentration became 0% within 15 days.

B: The oxygen concentration did not reach 0% within 15 days.

(Evaluation of Oil Resistance)

A doughnut having a large oil content was placed on each of the air-permeable packaging materials obtained in Examples 1 to 3 and Comparative Examples 1 to 4, and a commercially available oil blotting paper was placed beneath thereof, and this was stored for two weeks in a thermostat at 30° C. After storage for two weeks, the oil blotting paper was taken out from the thermostat, and concerning the state of the oil blotting paper, oil resistance was evaluated according to the following criteria.

(Evaluation Criteria)

A: No stain was found on the oil blotting paper.

B: Stain appeared on the oil blotting paper.

TABLE 1

| | | Example 1 | Example 2 | Example 3 | Comparative Example 1 | Comparative Example 2 | Comparative Example 3 | Comparative Example 4 |
|---|---|---|---|---|---|---|---|---|
| First layer | Material | OPP | OPP | LLDPE | PET | PET | LLDPE | OPP |
| | Layer thickness | 6 μm | 12 μm | 15 μm | 12 μm | 12 μm | 20 μm | 40 μm |
| | Presence or absence of perforation | Absent | Absent | Absent | Present | Present | Absent | Absent |
| Second layer | Material | Reticulated structure (3-1) | Reticulated structure (3-1) | Reticulated structure (3-2) | Reticulated structure (3-2) | Reticulated structure (3-2) | Reticulated structure (3-2) | Reticulated structure (3-1) |
| | Presence or absence of perforation | Present | Present | Present | Present | Present | Present | Present |
| Third layer | Material | | Core-sheath nonwoven fabric | Core-sheath nonwoven fabric | MPF40g | LLDPE (Layer thickness: 20 μm) | Core-sheath nonwoven fabric | Core-sheath nonwoven fabric |
| | Presence or absence of perforation | | Present | Present | Absent | Absent | Present | Present |
| Oxygen permeation | | A | A | A | A | B | B | B |
| Oil resistance | | A | A | A | B | A | A | A |

In Table 1, various abbreviations have the following meanings.

OPP: Biaxially stretched polypropylene film
LLDPE: Linear low-density polyethylene film
PET: Polyethylene terephthalate film From the results shown in Table 1, it was verified that the air-permeable packaging materials of Examples 1 to 3 to which the present invention was applied had satisfactory oxygen permeation (air-permeability) and oil resistance.

Thus, preferred embodiments of the present invention have been described above; however, the present invention is not intended to be limited to these embodiments. To the extent that the gist of the present invention is maintained, addition, omission, substitution, and other modification of the configuration can be made. The present invention is not to be limited by the description given above and is limited only by the scope of the appended claims.

REFERENCE SIGNS LIST

1 Air-permeable packaging material
2 Non-perforated polyolefin layer
3 Reticulated reinforcing layer
31 Split web
32 Slit web
33 Layer formed from reticulated structure (reticulated structure layer)
34 Nonwoven fabric
5 Functional article
6 Package

The invention claimed is:

1. An oxygen-permeable packaging material comprising:
a non-perforated polyolefin layer having a thickness of 3 µm to 18 µm and formed of at least one selected from the group consisting of polypropylene and polyethylene; and
a reticulated reinforcing layer made of a laminated nonwoven fabric in which a split web and/or a slit web are laminated and adhered such that stretching directions of the split web and/or the slit web being laminated approximately orthogonally intersect each other, wherein
the split web is formed by uniaxially stretching a film in a longitudinal direction thereof, splitting the stretched film at a plurality of sites along the longitudinal direction, and expanding the stretched and splitted film in a transverse direction that orthogonally intersects the stretching direction, and
the slit web is formed by uniaxially stretching a film having a plurality of slits.

2. The oxygen-permeable packaging material according to claim 1, wherein the non-perforated polyolefin layer is formed of a linear low-density polyethylene.

3. The oxygen-permeable packaging material according to claim 1, wherein the reticulated reinforcing layer contains a reticulated structure which consists of a laminate or woven fabric of a first fiber layer formed of a plurality of first fibers arranged in a mutually identical direction, and a second fiber layer formed of a plurality of second fibers arranged in a direction different from the plurality of first fibers and in a mutually identical direction.

4. The oxygen-permeable packaging material according to claim 3, wherein
the plurality of first fibers and the plurality of second fibers each includes a first thermoplastic resin layer formed of a first thermoplastic resin and a second thermoplastic resin layer formed of a second thermoplastic resin,
a difference in melting points between the first thermoplastic resin and the second thermoplastic resin is 5° C. or higher, and
the plurality of first fibers and the plurality of second fibers are adhered to each other using the second thermoplastic resin layer as an adhesive layer.

5. The oxygen-permeable packaging material according to claim 3, wherein
the non-perforated polyolefin layer is formed of a linear low-density polyethylene, and
the reticulated structure is formed of a linear low-density polyethylene.

6. The oxygen-permeable packaging material according to claim 3, wherein the non-perforated polyolefin layer is formed of polypropylene, and
the reticulated structure is formed of polypropylene.

7. The oxygen-permeable packaging material according to claim 3, wherein the reticulated reinforcing layer has a layer formed of the reticulated structure and a nonwoven fabric other than the reticulated structure.

8. The oxygen-permeable packaging material according to claim 1, wherein
the reticulated reinforcing layer includes
at least one a split web as an uniaxially stretched reticulated film, which is generated by uniaxially stretching a multilayer film in a length direction thereof, splitting fibers of the multilayer film at a plurality of sites along the length direction, and widening the multilayer film in a width direction thereof.

9. The oxygen-permeable packaging material according to claim 1, wherein the reticulated reinforcing layer includes
at least one a slit web as an uniaxially stretched reticulated film, which is generated by forming a plurality of slits in a multilayer film, wherein the slits extend in a width direction of the multilayer film, and uniaxially stretching the multilayer film.

10. The oxygen-permeable packaging material according to claim 1, wherein the reticulated reinforcing layer includes
at least one a split web as an uniaxially stretched reticulated film, wherein the split web is generated by uniaxially stretching a multilayer film in a length direction thereof, splitting fibers of the multilayer film at a plurality of sites along the length direction, and widening the multilayer film in a width direction thereof, and
at least one a slit web as an uniaxially stretched reticulated film, wherein the slit web is generated by forming a plurality of slits in a multilayer film, wherein the slits extend in a width direction of the multilayer film, and uniaxially stretching the multilayer film,
wherein uniaxially stretching direction of the split web and uniaxially stretching direction of the slit web approximately orthogonally intersect each other.

11. The oxygen-permeable packaging material according to claim 8, wherein the split webs are laminated and adhered such that their stretching directions approximately orthogonally intersect each other.

12. The oxygen-permeable packaging material according to claim 10, wherein the split web and the slit web are formed of polyethylene or polypropylene.

13. A package, comprising:
the oxygen-permeable packaging material according to claim 1 used in at least a portion thereof, wherein the non-perforated polyolefin layer is disposed on an outer side thereof, the reticulated reinforcing layer is disposed on an inner side wherein both ends of the reticulated reinforcing layer come into contact with and face each other to form a bag-shaped oxygen-permeable packaging material and a peripheral edge of the oxygen-permeable packaging material has been heat-sealed, and an oxygen scavenger stored in the oxygen-permeable packaging material.

14. A method for producing a package, the method comprising:

making the oxygen-permeable packaging material into a bag shape using the oxygen-permeable packaging material according to claim 1 in at least a portion of the package such that the reticulated reinforcing layer is disposed on an inner side and both ends of the reticulated reinforcing layer come into contact with and face each other;

storing an oxygen scavenger in the bag-shaped oxygen-permeable packaging material; and heat-sealing a peripheral edge of the bag-shaped oxygen-permeable packaging material by a heat pressing method.

* * * * *